June 15, 1965  N. W. MATISON  3,188,908
COLOR ENLARGER

Filed June 12, 1961  4 Sheets-Sheet 1

INVENTOR:
Nicholas W. Matison

Attorneys

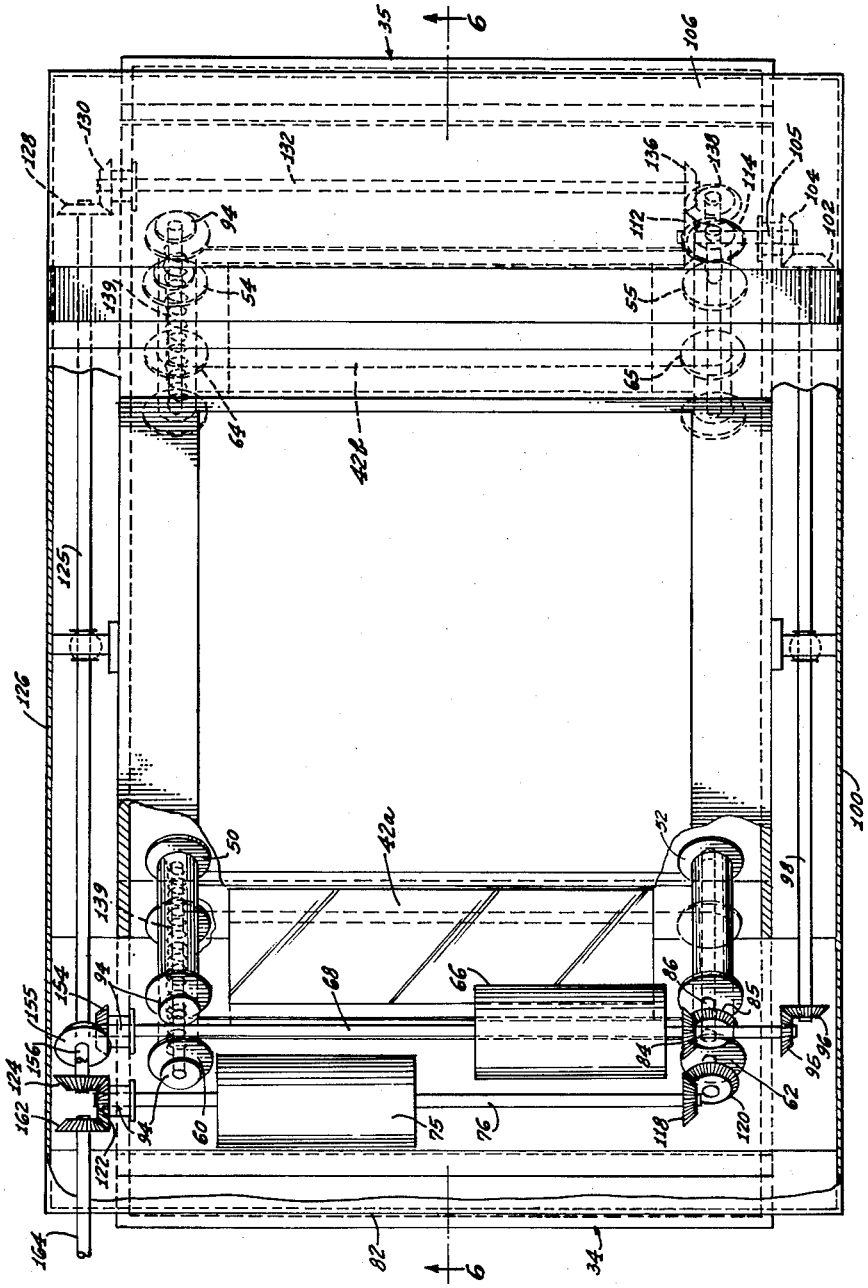

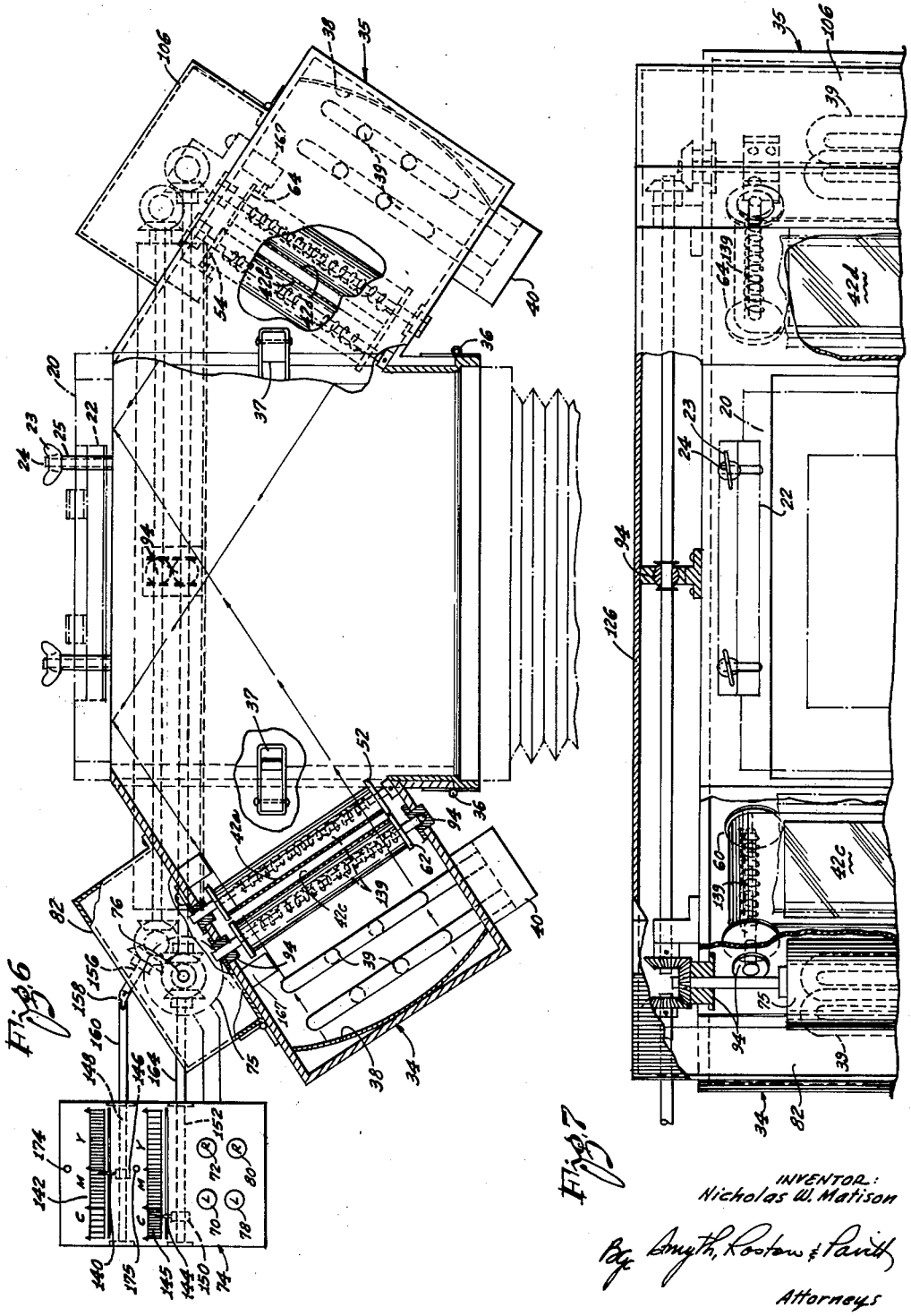

June 15, 1965 N. W. MATISON 3,188,908
COLOR ENLARGER
Filed June 12, 1961 4 Sheets-Sheet 4
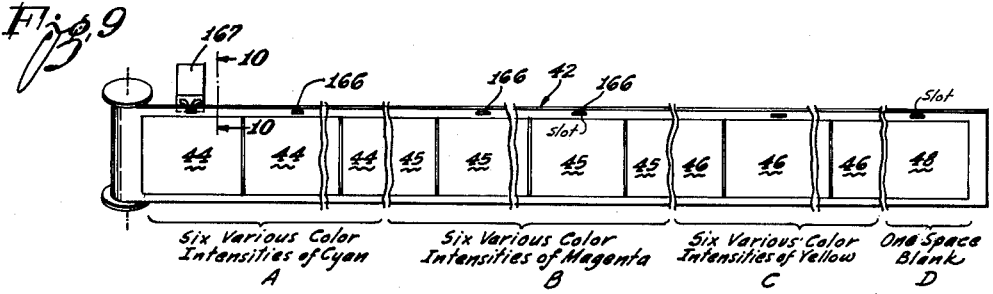
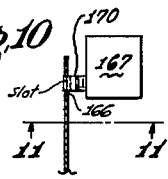
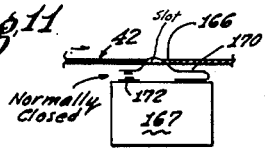
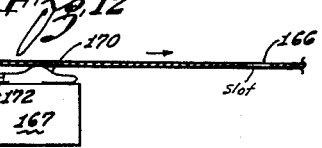
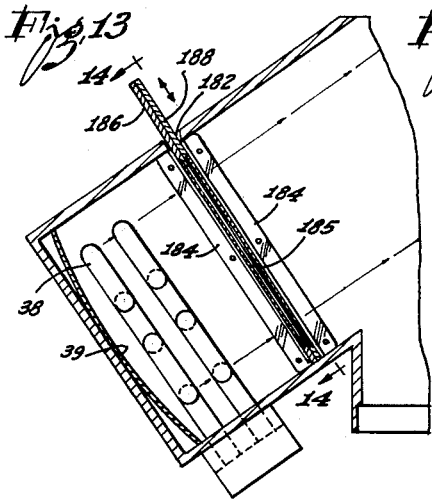
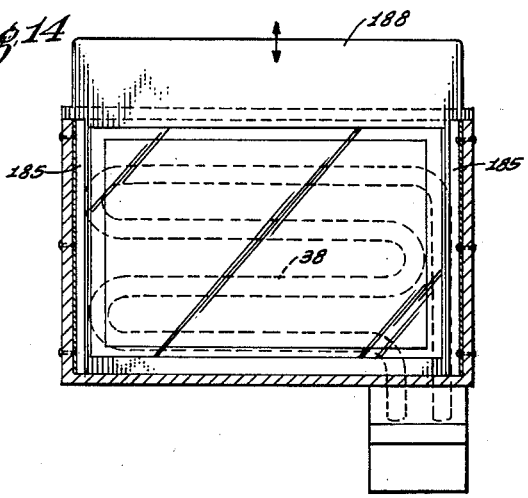
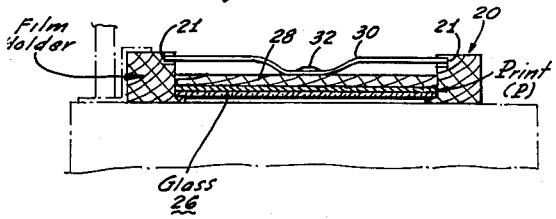
INVENTOR:
Nicholas W. Matison
Attorneys

United States Patent Office 3,188,908
Patented June 15, 1965

3,188,908
COLOR ENLARGER
Nicholas W. Matison, Los Angeles, Calif., assignor to Continental Color Corporation, Santa Monica, Calif., a corporation of California
Filed June 12, 1961, Ser. No. 116,613
12 Claims. (Cl. 88—24)

This invention relates to a photographic enlarger and, more particularly, an enlarger capable of making colored copies from an opaque colored master print. Obviously, such an enlarger may also be used to make black and while copies of an opaque master print.

In prevailing practice, enlargements are made from transparencies rather than from opaque prints. If a opaque print, either colored or black and white, is to be copied under present practice, the opaque print is first photographed to obtain a transparency and then the transparency is used to make the copy. There is a pressing need for a commercially feasible technique for making a copy direct from an opaque print without requiring the intermediate step of making a transparency.

To obtain an image from an opaque print it is necessary, of course, to reflect light from the print. The problem of adequately illuminating a master print for this purpose is complicated by the fact that a substantial portion of the incident light is lost by absorption by the print and by random reflection from the print. Since the image projected by reflection is such a reduced portion of the light from the light source, relatively high energy is required at the light source. It becomes a problem to produce the required intensity of light without producing an intolerable amount of heat. This problem is aggravated when color-correcting filters are used with consequent further absorption of light.

The invention meets this problem by using a relatively cool but highly efficient light tube in a well ventilated compartment. The problem is further solved by using such a light tube with numerous bends to emit light from a substantial area. The required intensity of the incident light on the master print is further achieved by using two such lamp compartments on opposite sides of the master print.

A further problem met by the invention is to provide for effective color correction by filter means to compensate for color unbalance in a master print and to match the particular sensitivity spectrum of the emulsion being used in the enlarger. A feature of the invention in this respect is the use of filters located between the light sources and the master print.

The preferred practice of the invention is further characterized by the concept of using a filter in the form of a long flexible band wound on spools, the band having a series of panels or frames of colored transparencies of different colors and density. For a highly efficient commercial enlarger with two lamp compartments, a pair of filter bands for the two lamp compartments respectively is required for each color correction. A feature of the invention is the use of such a pair of filter bands in which the two bands for the two respective compartments are interlocked for synchronous operation under a common control. Since two color corrections may be required in making a colored copy, two such pairs of synchronized filter bands are provided.

A further feature of the preferred practice of the invention is the provision of power-actuated filter bands and the further provision of index means remote from the filter bands to indicate which filter panels are in positions to affect the projected image. With the index means under observation, it is a simple matter for the operator to manipulate controls for selecting the particular panels on the filter bands that are required for any particular printing operation. In making a color reproduction, the colors in the image from the master print may be first analyzed by a suitable instrument and then the remotely controlled filter band arrangement may be operated for positioning of the particular filter panels required for color correction. These preliminary steps may be carried out expeditiously to achieve a high production rate with a single enlarger.

A further and economically important advantage of the invention is that it makes it possible to use opaque light-sensitive material in a camera instead of conventional light-transmitting film. If an enlargement is to be made by transmitted light, a light-transmitting film in the camera is mandatory because the latent image produced in a camera is necessarily an inverted image. In making a copy, either by contact printing or by means of an enlarger, light is projected through the developed transparency from the side that results in correction of the inversion. In the new procedure of using colored opaque light-sensitive material in the camera, the inversion of the image by the camera lens is compensated by the lens in the enlarger inverting the image reflected from the master print. Such a procedure completely eliminates the need for relatively expensive conventional film.

The features and advantages of the invention may be understood from the following detailed descrpition and the accompanying drawings.

In the drawings, which are to be regarded as merely illustrative:

FIG. 5 is a plan view of the upper end of the enlarger housing with portions broken away to reveal concealed structure;

FIG. 6 is a view that is partly schematic and partly in section, the section being taken along the line 6—6 of FIG. 5;

FIG. 7 is a fragmentary view similar to FIG. 5 with additional parts removed to reveal structure at a lower level;

FIG. 8 is a fragmentary transverse section through the top of the housing showing the construction of a holder for a master colored print;

FIG. 9 is a schematic view showing the construction of a filter sheet in the form of a band for use in the selected embodiment of the invention;

FIG. 10 is a view seen along the line 10—10 of FIG. 9 showing a switch which is part of a signal circuit to indicate the correct positioning of frames of the filter sheet for coloring the illumination of the master print;

FIG. 11 is a view of the switch as seen along the line 11—11 of FIG. 10 showing the switch in open position when registered with a slot in the filter sheet;

FIG. 12 is a view similar to FIG. 11 showing how the switch is closed when it is not opposite a slot in the filter sheet;

FIG. 13 is a fragmentary sectional view similar to FIG. 6 showing a second embodiment of the invention which employs interchangeable filter plates; and FIG. 14 is a section taken along the line 14—14 of FIG. 13:

Figure 1:
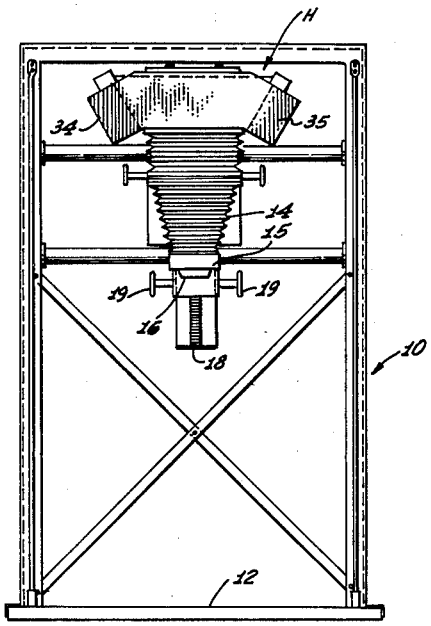
FIG. 1 is a front elevation of a selected embodiment of the invention.
Figure 2:
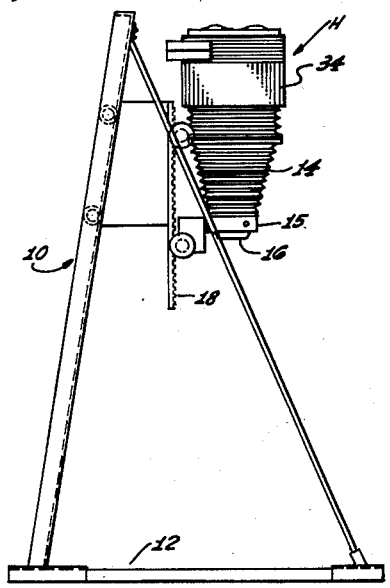
FIG. 2 is a side elevation.

As shown in FIGS. 1 and 2, an enlarger incorporating the principles of the invention may be of a well-known type mounted on a frame structure 10 to be adjusted in height relative to an easel 12. The positive image from the enlarger is directed onto light-sensitive sheet material on the easel for photoprinting in a well-known manner. Thus the light-sensitive material is any suitable color reversal material. The enlarger has a housing generally designated H which includes a bellows 14 connected to a lens mount 15 that carries a lens 16. For focusing purposes the lens mount is movable by gear means along a rack 18 under the control of a pair of knobs 19.

The upper portion of the housing H is suitably adapted to carry a master color print that is to be copied by the enlarger. For this purpose a conventional holder of the construction shown in FIG. 8 may be employed. The holder comprises the usual rectangular frame 20 having inner longitudinal slots 21 on its opposite sides. The rectangular frame may be releasably secured by a pair of brackets 22 (FIGS. 6 and 7) on its opposite sides, the brackets in turn being secured by thumb screws 23 on screws 24, the screws 24 being provided with spacer sleeves 25. The master print P that is to be copied, rests face down on a sheet of glass 26 under the pressure of a backing plate 28. In a well-known manner the backing plate has a pair of spaced leaf springs 30, each leaf spring being mounted on the backing plate by a central pivot 32. The releasable engagement of the opposite ends of the leaf springs 30 with the inner slots 21 provides the desired pressure against the back of the master color print.

The housing H incorporates a pair of suitably ventilated lamp compartments 34 and 35 on opposite sides of the print holder, the lamp compartments being positioned to direct beams of light onto a master print P at an acute angle relative thereto. Each of the two lamp compartments may be adapted to be opened for access and for this purpose the wall structure of each lamp compartment may be mounted on hinges 36. The lamp compartments may be normally held in their closed positions by suitable latches 37.

Each of the two lamp compartments encloses a suitable reflector 38 and a suitable light source. In this particular embodiment of the invention each light source comprises a quartz tube lamp 39 of a well-known type which generates exceptionally low heat and which emits light at 3500° K. Each of the two lamps 39 is energized by an associated transformer (not shown) and is provided with an external electrical receptacle 40 for plugging the lamp into an electric circuit.

Suitable color filter means is provided to achieve color balance in the colored copy in the event color correction is required for such balance. A feature of this particular embodiment of the invention is the concept of employing filter means in the form of a filter sheet comprising a series of interconnected filter panels of different colors. This concept may be carried out in various ways.

In this instance the concept is carried out by employing filter means in the form of a flexible band under the control of suitable spools or reels. As shown in FIG. 9 such a band, generally designated 42, may be divided into a series of panels of different colors and different densities. The flexible band 42 has six panels 44 of different densities of cyan, six panels 45 of magenta and six panels 46 of yellow. The densities in each series of six panels are suitably graduated. In this instance the six densities are .05, .10, .20, .30, .40 and .50. In addition the flexible band 42 has a clear or substantially transparent panel 48.

As indicated in FIG. 6, the present embodiment of the invention provides a first pair of filter bands 42a and 42b for the two lamp compartments 34 and 35 respectively and a second pair of filter bands 42c and 42d, the filter bands of each pair being synchronized to place identical filter panels simultaneously at the two lamp compartments. As indicated in full lines on the left side of FIG. 5, the filter band 42a is wound onto a pair of spools 50 and 52 on opposite sides of the lamp compartment 34 and, as indicated in dotted lines on the right hand of the FIG. 5, the other filter band 42b of the pair is mounted on two spools 54 and 55 on opposite sides of the lamp compartment 35. In like manner, as indicated in FIGS. 5 and 7, the filter band 42c is carried by a pair of spools 60 and 62 on opposite sides of the lamp compartment 34 and the corresponding filter band 42d is carried by a pair of spools 64 and 65 on opposite sides of the lamp compartment 35. As may be seen in FIG. 6, the two filter bands 42a and 42c at the lamp compartment 34 are positioned face to face to intercept the light beam from the corresponding light source 38 and the two filter bands 42b and 42d are similarly positioned at the lamp compartment 35 to intercept the second beam of light.

The various spools may be interlocked and actuated for the synchronous travel of the two filter bands of each pair of filter bands. In the present embodiment of the invention shafts and gearing are used for this purpose in a manner shown in FIGS. 5, 6 and 7.

The two filter bands 42a and 42b of the two lamp boxes 34 and 35 are actuated by a reversible motor 66 (FIG. 5) having a motor shaft 68. The motor 66 may be energized for rotation in opposite directions by depressing selectively a left push button switch 70 and a right push button switch 72 on a small control panel 74 that is shown diagrammatically in FIG. 6. In like manner the pair of filter bands 42c and 42d are controlled by a second reversible motor 75 having a motor shaft 76. The second motor 75 is controlled by a pair of left and right push button switches 78 and 80 on the control panel 74. As best shown in FIG. 6, the two motors 66 and 75 together with the corresponding motor shaft 68 and 76 may be enclosed by a gear box 82 that is mounted on the upper surface of the lamp compartment 34.

A bevel gear 84 on the motor shaft 68 meshes with a bevel gear 85 on a shaft 86 that carries the spool 52. Each of the motor shafts, counter shafts and the shafts for the various spools is journaled in suitable bearings 94.

The motor shaft 68 has a second bevel gear 95 which, as shown in FIG. 5, meshes with a bevel gear 96 on a counter shaft 98. The counter shaft 98 is mounted on suitable bearings in a gear box 100 on the exterior of the enlarger housing, the gear box extending from the region of the lamp compartment 34 to the region of the lamp compartment 35. The counter shaft 98 carries a bevel gear 102 in mesh with a cooperating bevel gear 104 to drive a second counter shaft 105 in a gear box 106 that is mounted on the second lamp compartment 35. The second counter shaft 105 has a bevel gear 112 in mesh with a bevel gear 114 to drive the spool 55.

For controlling the second pair of filter bands 42c and 42d, the second motor shaft 76 is operatively connected to the two spools 62 and 65 in the same manner. The motor shaft 76 has a bevel gear 118 in mesh with a bevel gear 120 for driving the spool 62. The motor shaft 76 has a second bevel gear 122 in mesh with a bevel gear 124 on a counter shaft 125 that extends through a gear box 126. Another bevel gear 128 on the counter shaft 125 meshes with a bevel gear 130 on another counter shaft 132 in the gear box 106. A bevel gear 136 on the counter shaft 132 meshes with a bevel gear 138 to drive the spool 65.

Each of the four driven spools 52, 55, 62 and 65 is actuated against the resistance of a torque spring 139 inside each of the four corresponding spools 50, 54, 60 and 64. The four torque springs 139 keep the corresponding four filter bands 42 taut across the lamp compartments and wind up the filter bands whenever the rotation of the driven spools is reversed. The four springloaded spools 50, 54, 60 and 64 are in effect slaves respectively of the four driven spools 52, 55, 62 and 65.

A feature of this embodiment of the invention is the concept of providing suitable visual index means to indicate which colored panels of the filter bands are in effective positions at the two lamp boxes 34 and 35. For this purpose a pointer 140 (FIG. 6) on the control panel 74 may traverse a scale 142 representing the sets of cyan, magenta and yellow panels of the first pair of filter bands 42a and 42b at the two lamp compartments respectively. A second pointer 144 traverses a second scale 145 and represents the panels of the second pair of filter bands 42c and 42d. The pointer 140 is carried by a traveling nut 146 on a worm 148 and the pointer 144 is carried by a traveling nut on a second worm 152.

For actuation of the pointer 140 a bevel gear 154 on the motor shaft 68 meshes with a bevel gear 155 on a shaft 156. As shown in FIG. 6 the shaft 156 is connected by a universal joint 158 with a shaft 160 that is united with the worm 148. In like manner the previously mentioned bevel gear 122 on the second motor shaft 76 meshes with a bevel gear 162 on a shaft 164 that is unitary with the second worm 152 for driving the pointer 144.

With the driven spools 52, 55, 62 and 65 directly connected to the two pointers 140 and 144, the marks of the two scales 142 and 145 must be variably or unevenly spaced because the effective diameters of the driven spools vary with the amount of the corresponding filter bands that are wound on the spools. When a driven spool has several windings of a filter band thereon, a relatively small amount of rotation of the spool causes the filter band to travel a given distance but if the spool is nearly empty greater rotation is required to cause the filter band to travel the same distance.

Figure 4:
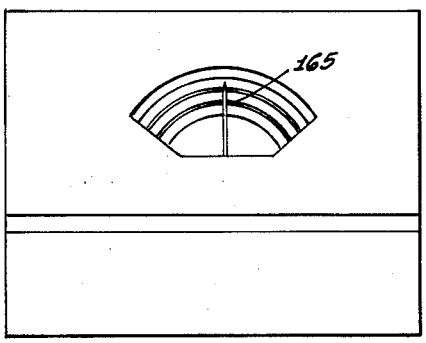
FIG. 4 is a front elevation of a conventional instrument for analyzing colored prints with respect to color balance.

The manner in which the invention serves its purpose may be readily understood from the foregoing description. In a typical procedure, an opaque master print P is mounted in the rectangular frame 20 and all of the four filter bands 42 are shifted to place the clear panels 48 of the filter bands at the two lamp compartments 34 and 35. The lamp tubes 39 are then energized to illuminate the master print P with clear light. The enlarger is then adjusted to focus an image of the master print on the easel 12. The projected image is then inspected to ascertain what color correction, if any, is required to produce a print that is color balanced. For this purpose a color-measuring instrument may be employed of a well known type shown in FIG. 4. Suitable color sensing means (not shown) of the instrument intercepts various portions of the colored image to indicate by means of a pointer 165 color values and whatever corrective colors should be provided by filter means. In some instances only one colored filter is required and in other instances two colored filters are required. The instrument shown in FIG. 4 is calibrated in terms of the previously listed densities of the colored panels of the filter bands.

The push buttons 70, 72, 78 and 80 on the panel 74 are manipulated as required to place the indicated filter panels at the two lamp compartments. The operator maneuvers the two pointers 140 and 145 to the selected filter panel scale marks. The driven spools 52, 55, 62 and 65 are actuated accordingly.

The lamp tubes 39 of the enlarger are then de-energized, a light-sensitive sheet is placed on the easel 12 and then the lamp tubes are again energized for a sufficient period of time to print a latent image on the light-sensitive sheet.

If desired, index means directly responsive to the travel of the filter bands may be provided to indicate when the various panels of the filter bands are correctly positioned or centered at the two lamp boxes. For this purpose, one filter band of each pair of filter bands may be formed with marginal slots 166 corresponding respectively to the color frames on the band. FIG. 9 shows such marginal slots 166 for the eighteen color panels respectively and for the clear panel 48.

For cooperation with a slotted filter band, a suitable switch 167 is positioned adjacent the slotted margins of the filter band in the manner shown in FIGS. 9, 10, 11 and 12. The switch 166 has an operating arm in the form of a leaf spring 170 carrying a switch contact 172. Normally, i.e. when the switch 167 is out of register with a slot 166, the switch contact 172 is in closed position as shown in FIG. 12. When a panel is centered across a light beam, the switch arm 170 registers with a marginal slot 165, the switch arm takes the open position shown in FIG. 11.

The switch 167 that is associated with a filter band driven by the motor 66 controls a signal lamp 174 on the control panel 74 and the switch 167 that is associated with a filter band controlled by the second motor 75 energizes a second signal lamp 175 on the panel. When the upper pointer 140 is at a selected mark on the scale 142, the push button switches 70 and 72 may be manipulated as required to cause a signal lamp 174 to turn off and thus indicate that the desired filter panel is precisely centered at each of the two lamp compartments. In like manner when the lower pointer 144 is at a selected point on the scale 145 the push button switches 78 and 80 may be manipulated to cause a lower signal lamp 175 to turn off.

The master print P may, of course, be either a colored transparency or an opaque colored print. Since the lens of the enlarger inverts the image, a transparency used for a master print is inverted in its position in the enlarger, i.e. reversed left for right by turning the transparency over. Since an opaque master print cannot be reversed in this manner in the enlarger, the enlarger is used with a mirror in the manner shown in FIG. 3.

Figure 3:
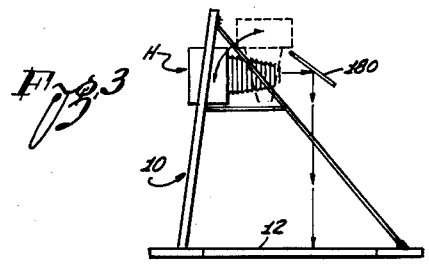
FIG. 3 is a side elevation on a reduced scale showing how a mirror may be used to invert an image on an easel and the enlarger may be pivoted to project the image either onto the mirror or directly onto the easel.

In FIG. 3 the enlarger housing H is mounted on the frame 10 to swing from a normal vertical position to the horizontal position shown in full lines. An inclined mirror 180 or other light reflecting means is positioned to intercept the optical axis of the enlarger and to reflect the image downward onto the easel 12 in the manner indicated by the broken lines. Since the mirror 180 inverts the image, it compensates for the inversion of the positive image by the lens of the enlarger and thus results in a correct positive image on the easel. If a camera is used to obtain a master print the master print image is, of course, inverted. In such an instance, the mirror 180 is not used.

FIGS. 13 and 14 show how the described enlarger construction may be modified to use filter means in the form of rigid plates instead of highly flexible sheets. Each of the two lamp compartments is formed with a slot 182 on its upper side. Aligned with the slot 182 at opposite ends thereof are angular guide brackets mounted in pairs on the inner walls of the lamp compartment. The pairs of guide brackets 184 provide channels 185 to receive the filter plates. FIG. 13 shows two filter plates 186 and 188 installed in the guide channels 185 to intercept the beam of light from the lamp. The slot 182 that receives the filter plates is provided with light-sealing means (not shown) in a well known manner, which light-sealing means may comprise strips of felt. Eighteen filter plates may be provided for interchangeable use corresponding to the eighteen colored frames of the previously described filter band 42.

My description in specific detail of the presently preferred practice of the invention will suggest various changes, substitutions and other departures from my disclosure within the spirit and scope of the appended claims.

I claim:

1. An appartaus for producing a colored positive opaque copy from a master colored opaque positive print by light reflected from the master print, comprising: a housing having a closed chamber portion adapted for holding a master colored opaque positive print; means inside the chamber to project light onto said portion for illumination of a master print thereon; an easel in exposed position outside the housing for holding a light-sensitive sheet of color reversal material; lens means in the wall of the housing project an image of the illuminated caster print onto said easel to permit the image to be analyzed with respect to color balance; a plurality of colored filter elements; and means to support a selected color filter element in position to intercept and modify the light projected onto the master print for printing color correction to achieve color balance.

2. An apparatus for producing a colored positive opaque copy from a master colored opaque positive print by light reflected from the master print, comprising: a housing having a closed chamber portion adapted for holding a master colored opaque positive print; means inside the chamber to project light onto said portion for illumination of a master print thereon; an easel in exposed position outside the housing for holding a light-sensitive sheet of color reversal material; lens means in the wall of the housing to project an image of the illuminated master print; a plurality of colored filter elements; light-reflecting means positioned to intercept the light reflected from the master print thereby to invert the image to compensate for inversion of the image by the lens means and to project the inverted image onto the easel to permit the image to be analyzed with respect to color balance; and means to support a selected color filter element in position to intercept and modify the light projected onto the master print for printing color correction.

3. An apparatus for producing a colored positive opaque copy from a master colored opaque print by light flected from the master print, comprising: a housing having a closed chamber portion adapted for holding a master colored opaque print; means united with said housing inside the housing to project light onto said portion for illuminating a master print thereon; an optical system carried by said housing to project an image of the master print outwardly from the housing; an easel in exposed position outside the housing for holding a light-sensitive sheet of color reversal material to receive the projected image of the master print to permit the image to be analyzed with respect to color balance; and light-reflecting means, said housing being movable between a first position to direct the outwardly projected image directly onto the easel and a second position to direct the image onto said light-reflecting means, the light-reflecting means being positioned to reflect the image onto the easel.

4. An appartaus for producing a colored positive opaque copy from a master colored opaque positive print by light reflected from the master print, comprising: a housing having a closed chamber portion adapted to hold a master colored opaque positive print, said housing having two lamp compartments on opposite sides of said chamber portion positioned at acute angles thereto; light sources in said two compartments respectively to direct corresponding identical light beams onto said portion; two sets of light filters; means to hold identical light filters from the two sets respectively in positions intercepting said light beams respectively for coloring the illumination of a master print on said portion of the housing; an easel in exposed position outside the housing for holding a light-sensitive sheet of color reversible material; and an optical means in the wall of said housing to project an image of illuminated master print outward from the housing onto said easel to permit the image to be analyzed with respect to color balance.

5. An apparatus for producing a colored positive opaque copy from a master colored opaque positive print by light reflected from the master print, comprising: a housing having a portion adapted to hold a master colored opaque positive print; two identical light sources on opposite sides of said portion positioned to direct two corresponding identical light beams onto said portion at acute angles relative thereto; a first pair of elongated flexible filter sheets having panels of different colors for intercepting said two beams respectively; a second pair of elongated flexible filter sheets, having panels of different colors for intercepting said two beams respectively; a first actuating means to shift said first pair of filter sheets in synchronism to place similar panels thereof selectively across said two light beams respectively; a second actuating means to shift said second pair of filter sheets in synchronism to place similar panels thereof selectively in positions across said two light beams respectively; an easel for holding a light-sensitive sheet of color reversal material; and an optical system in the wall of the housing to project an image of the illuminated master print on said easel.

6. A combination as set forth in claim 5 in which each of said sheets includes at least one clear panel.

7. An apparatus for producing a colored positive opaque copy from a master colored opaque positive print by light reflected from the master print, comprising: a housing having a portion adapted to hold a master colored opaque positive print; two light sources on opposite sides of said portion positioned to direct two corresponding identical light beams onto said portion at acute angles relative thereto to illuminate a master print thereon; a first pair of elongated flexible filter sheets having panels of different colors for intercepting said two beams respectively; a second pair of elongated flexible filter sheets having panels of different colors for intercepting said two beams respectively; a first actuating means to shift said first pair of filter sheets in synchronism to place similar panels thereof selectively across said two light beams respectively; a second actuating means to shift said second pair of filter sheets in synchronism to place similar panels thereof selectively in positions across said two light beams respectively; an easel for holding a light-sensitive sheet of color reversal material; an optical system in the wall of the housing to project an image of the illuminated master print on said easel; and two index means responsive to shift of said two pairs of sheets respectively to indicate which panels thereof intercept the two light beams.

8. A combination as set forth in claim 7 which includes two signal means responsive to shift of the two pairs of filter sheets respectively to indicate when panels thereof are correctly positioned to intercept the two light beams.

9. An apparatus for producing a colored positive opaque copy from a master colored opaque positive print by light reflected from the master print, comprising: a housing having a portion adapted to hold a master colored opaque positive print; two light sources on opposite sides of said portion positioned to direct two corresponding identical light beams onto said portion at acute angles relative thereto to illuminate a master print thereon; a first pair of elongated flexible filter sheets having panels of different colors for coloring said two beams respectively; a second pair of elongated flexible filter sheets having panels of different colors for intercepting said two beams respectively; two spools for each of said filter sheets positioned respectively on opposite sides of the corresponding light beam to stretch the sheet across the light beam; means to operate said spools for shifting said panels; and two index means synchronized with the spools for the two pairs of filter sheets respectively to indicate which panels thereof intercept the two light beams, respectively.

10. A combination as set forth in claim 9 which includes two signal means to indicate when panels of the two pairs of sheets respectively are in effective positions across the two light beams; which includes switch means to control said signal means; and in which means carried by the filter sheets operate said switch means.

11. The combination as set forth in claim 10 in which said means to operate the switch means comprise slots formed in the filter sheets.

12. An apparatus for producing a colored positive opaque copy from a master colored opaque print by light reflected from the master print, comprising:

a housing having a portion adapted to hold a master colored opaque print;

lamp means to illuminate the master opaque print;

filter means to modify the light projected by the lamp means onto the area of the master print;

an easel to hold a light sensitive sheet of color reversal material;

optical means to receive the light reflected from the master print and to project an image of the master print onto the easel to permit analysis of the projected image with respect to color balance;

light reflecting means; and means operative to incorporate the light reflecting means into the optical system to reverse the image on the easel when the image is reversed on the master opaque print.

References Cited by the Examiner

UNITED STATES PATENTS

| | | | |
|---|---|---|---|
| 2,438,219 | 3/48 | Johnston | 88—24 |
| 2,469,891 | 5/49 | Powers et al. | 88—24 |
| 2,734,435 | 2/56 | Leonardi | 88—24 X |
| 2,736,229 | 2/56 | Huebner | 88—24 |
| 2,741,944 | 4/56 | Gunther | 88—24 |
| 2,794,365 | 6/57 | Baasner et al. | 88—24 |
| 3,026,410 | 3/62 | Azan | 88—24 X |
| 3,028,483 | 4/62 | Simmon | 88—24 X |

NORTON ANSHER, *Primary Examiner.*

EMIL G. ANDERSON, *Examiner.*